(12) United States Patent
Hua

(10) Patent No.: US 9,246,301 B1
(45) Date of Patent: Jan. 26, 2016

(54) BEAM-CONTROL APPARATUS FOR GAS-DISCHARGE SLAB-LASER

(71) Applicant: Coherent, Inc., Santa Clara, CA (US)

(72) Inventor: Gongxue Hua, Unionville, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 14/731,218

(22) Filed: Jun. 4, 2015

(51) Int. Cl.
  *H01S 3/03* (2006.01)
  *H01S 3/08* (2006.01)
  *H01S 3/223* (2006.01)
  *H01S 3/063* (2006.01)
  *H01S 3/081* (2006.01)

(52) U.S. Cl.
  CPC ........... *H01S 3/0805* (2013.01); *H01S 3/03* (2013.01); *H01S 3/0315* (2013.01); *H01S 3/063* (2013.01); *H01S 3/081* (2013.01); *H01S 3/0804* (2013.01); *H01S 3/0815* (2013.01); *H01S 3/08045* (2013.01); *H01S 3/2232* (2013.01)

(58) Field of Classification Search
  CPC ......... H01S 3/0315; H01S 3/03; H01S 3/063; H01S 3/0805; H01S 3/08045; H01S 3/0804; H01S 3/081; H01S 3/0815; H01S 3/2232
  USPC ................................. 372/64, 61, 55
  See application file for complete search history.

(56) References Cited

U.S. PATENT DOCUMENTS

| | | | |
|---|---|---|---|
| 5,822,354 A | 10/1998 | Vitruk | |
| 8,731,015 B2 * | 5/2014 | Newman | H01S 3/04 372/34 |
| 2006/0114961 A1 * | 6/2006 | Manni | H01S 3/0941 372/70 |
| 2008/0310462 A1 * | 12/2008 | Hollemann | H01S 3/0604 372/19 |

* cited by examiner

*Primary Examiner* — Kinam Park
(74) *Attorney, Agent, or Firm* — Morrison & Foerster LLP

(57) ABSTRACT

In a $CO_2$ gas-discharge slab-laser comprising an unstable resonator constrained by a waveguide formed by planar discharge-electrodes, parasitic side-lobes appear on either side of a delivered main mode in a direction perpendicular to the electrode plane. A rotationally adjustable aperture is provided for transmitting the main mode and blocking the parasitic side-lobes.

7 Claims, 5 Drawing Sheets

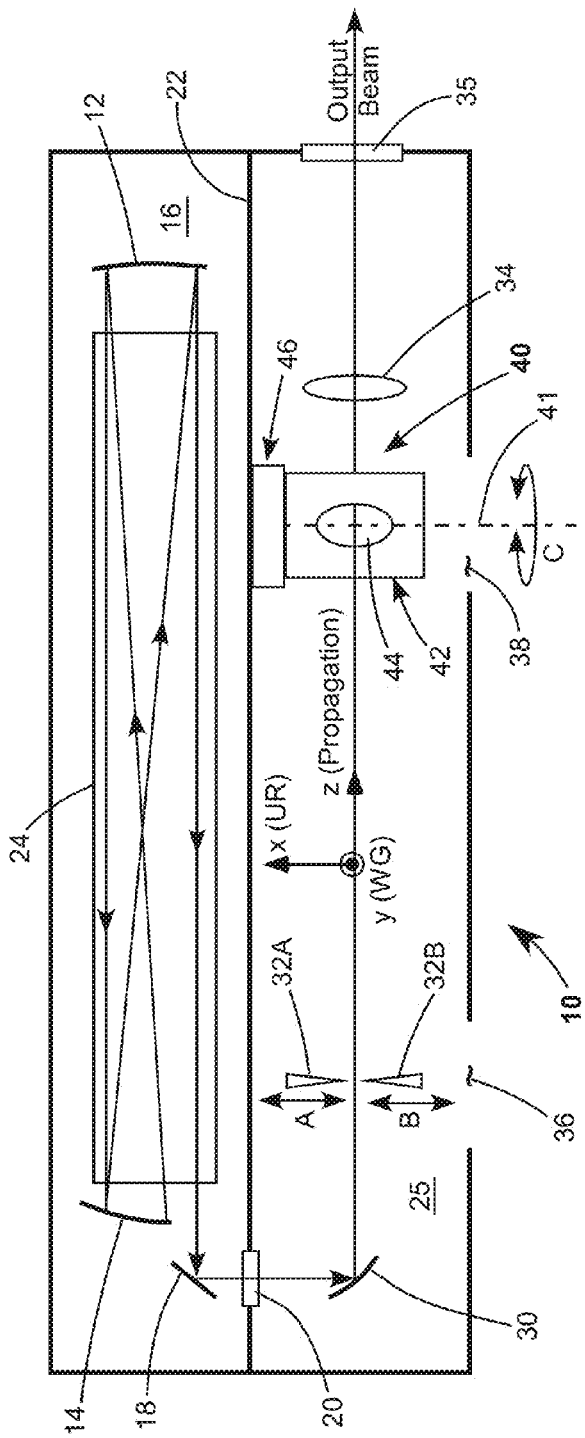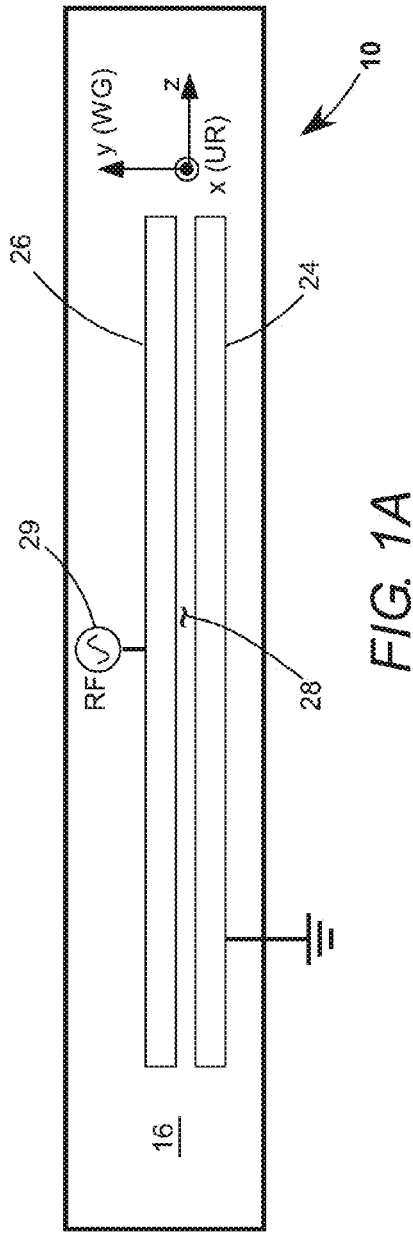
FIG. 1
FIG. 1A

US 9,246,301 B1

BEAM-CONTROL APPARATUS FOR GAS-DISCHARGE SLAB-LASER

TECHNICAL FIELD OF THE INVENTION

The present invention relates in general to carbon-dioxide ($CO_2$) gas-discharge slab-lasers. The invention relates in particular for apparatus for controlling characteristics of beams delivered by such lasers.

DISCUSSION OF BACKGROUND ART

A $CO_2$ gas-discharge slab-laser comprises an unstable resonator constrained in one transverse axis by a waveguide formed between spaced-apart, parallel, planar discharge electrodes of the laser. Typically the electrodes are spaced apart such that plural spatial lasing-modes are not supported in that transverse axis, which is perpendicular to the plane of the electrodes.

In a plane parallel to the plane of the electrodes, a plurality of spatial lasing-modes is generated by the unstable resonator. Because of this an output-beam from the laser, in the far field, absent any measures to control the beam, comprises a central mode (lobe) with increasingly weaker lobes (side-lobes) on opposite sides of the central mode, with all lobes aligned with each other in a direction parallel to the electrode-plane.

$CO_2$ slab-lasers are used extensively for laser-drilling operations in general, and for drilling via-holes in printed circuit boards in particular. A single spatial-mode beam is necessary for such drilling operations, preferably with a circularly symmetrical intensity distribution, most preferably in Gaussian form.

In order to provide such a single spatial-mode beam, adjustable parallel knife-edges are used to block passage of all side-lobes of the beam, passing only the central mode. Beam shaping optical elements are used to make the beam cross-section rotationally symmetrical, and a collimating lens is used to collimate the beam for transmission to focusing optics of remotely-located drilling optics.

It has been observed in certain instances, that if the collimated beam is transmitted a distance greater than about 3 meters (m) from the laser, the beam cross-section (beam-quality) can become progressively degraded with increasing transmission distance, thereby adversely affecting quality of holes drilled by the beam. There is a need for improving the quality of $CO_2$ slab-laser beams transmitted over distances significantly greater than 3 meters.

SUMMARY OF THE INVENTION

In one aspect, gas-discharge slab-laser apparatus in accordance with the present invention comprises an unstable laser-resonator constrained by a waveguide formed between spaced-apart, parallel, planar discharge electrodes, the waveguide-constraint being in a first transverse axis perpendicular to the planes of the electrodes. The laser-resonator and electrodes are configured and aligned such that an output-beam from the laser-resonator, in the far field, includes a main lobe with side-lobes on opposite sides of the main lobe, with the main lobe and side-lobes aligned with each other in a second transverse axis parallel to the electrode-plane. The output-beam from the laser-resonator further includes parasitic lobes on either side of the main lobe in the first-transverse-axis direction. A first adjustable aperture is provided for transmitting the main-lobe of the resonator output-beam and blocking the side-lobes of the resonator output-beam, and a second adjustable aperture is provided for transmitting the main lobe of the resonator output beam and blocking the parasitic lobes of the resonator output-beam.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1 and FIG. 1A schematically illustrate a preferred embodiment of gas-discharge slab-laser apparatus in accordance with the present invention, including an unstable resonator, parallel knife-edges for blocking lateral modes of the unstable resonator and transmitting a central mode of the unstable resonator, a rotationally adjustable aperture for blocking parasitic, vertical side-lobes of the transmitted central mode, and a collimating lens for collimating the central mode after passage through the rotationally adjustable aperture.

DETAILED DESCRIPTION OF THE INVENTION

Figure 2A:
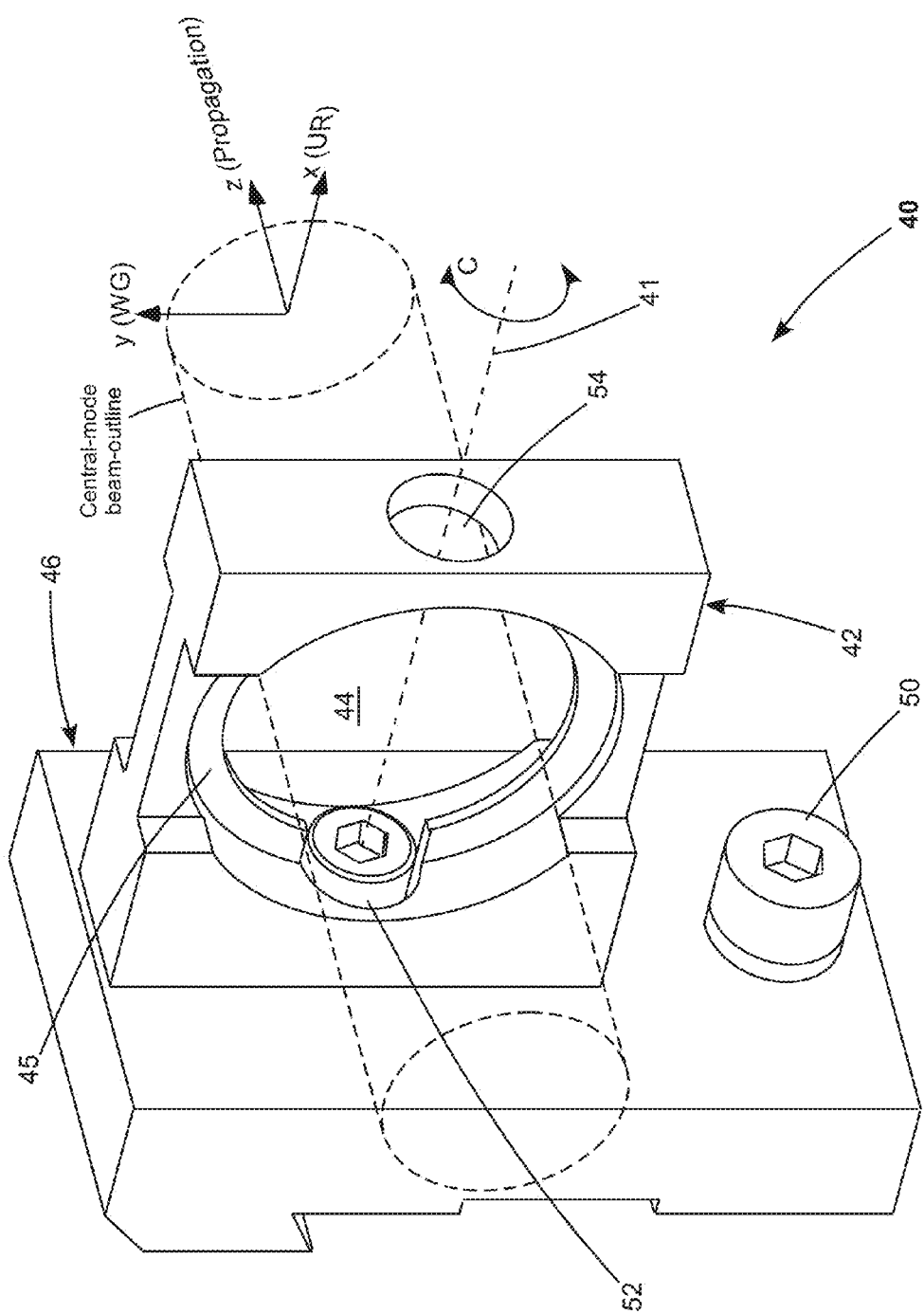
FIG. 2A is an isometric view schematically illustrating one preferred arrangement of the rotationally adjustable aperture of FIG. 1 with the aperture inclined normally to the transmitted central mode.

Turning now to the drawings, FIG. 1 and FIG. 1A schematically illustrates a preferred embodiment 10 of gas-discharge, slab-laser apparatus in accordance with the present invention. Apparatus 10 includes an unstable laser-resonator formed by mirrors 12 and 14. The resonator is housed in a hermetically sealed resonator-compartment 16, which contains a lasing-gas mixture at sub-atmospheric pressure. The lasing-gas mixture includes an active species such as $CO_2$ in a $CO_2$ laser, or CO in a CO laser, with the balance of the lasing-gas mixture comprising inert species, as is known in the art.

Laser-radiation generated in the resonator between resonator-mirrors 12 and 14, exits the resonator past mirror 14. The exiting laser-radiation is incident on a mirror 18 which steers the laser-radiation out of resonator-compartment 16, via a window 20 in a wall 22 of the resonator-compartment, into a beam-train compartment 25.

Within the laser-resonator, the laser-radiation is confined in a waveguide 28 formed between discharge electrodes 24 and 26 (see FIG. 1A). Mirrors 12, 14, and 18, are not shown in FIG. 1A for simplicity of illustration. A radio frequency (RF) power supply 29 is connected to electrode 26 and electrode 24 is grounded. When RF power is applied to electrode 26, a discharge is struck and sustained in waveguide 28, thereby energizing the laser-resonator. The electrodes are spaced apart by a distance small enough that lasing gas in the discharge between the electrodes can be diffusion cooled. The small gap creates a waveguide lasing-mode between the electrodes. This waveguide mode can form diffracted side-lobes when propagating in free-space.

For purposes of this description and appended claims, apparatus 10 is characterized as having an x-axis parallel to the plane of electrodes 26 and 28. The x-axis is alternatively designated as the unstable-resonator (UR) direction. A y-axis is perpendicular to the x-axis and is designated as the waveguide (WG) direction. A z-axis perpendicular to the x- and y-axes is designated, conventionally as the propagation direction.

Laser-radiation directed into beam-train compartment 25 is focused by a cylindrical focusing mirror 30, in the x-direction, onto knife-edges 32A and 32B, with the knife-edges aligned parallel to the waveguide direction. Preferably knife-edges 32A and 32B are separately adjustable in the unstable resonator direction as indicated by arrows A and B, respectively.

The laser-resonator is able to support a plurality of spatial lasing-modes in the UR-direction in the far field. These are arranged as a principle main or central mode bounded by side-lobe modes decreasing in size with distance from the central mode. This is described in detail further hereinbelow. The knife-edges are adjusted such that only the central mode in the unstable-resonator direction is transmitted between the knife-edges. A space 36 is provided in compartment 25 for adjusting the knife-edges. If the resonator and waveguides were perfectly aligned, this transmitted mode would be the only mode transmitted, and apparatus 10 would function as a single-spatial-mode laser.

It should be noted, here, that only sufficient description of laser apparatus 10 is presented for understanding principles of the present invention. The arrangement of gas-discharge slab-lasers is well known in the art, and, accordingly, a detailed description of such lasers is not presented herein. A detailed description of a compact $CO_2$ slab-laser, including adjustable knife-edges for UR-direction mode-selection, is provided in U.S. Pat. No. 8,731,015, assigned to the assignee of the present invention, and the complete disclosure of which is hereby incorporated herein by reference.

Analysis of apparatus 10 indicated that if the unstable resonator were slightly misaligned, parasitic side-lobe modes would appear with one thereof on either side of the central mode in the waveguide direction. These modes are described as parasitic because in an ideal laser such modes would not be present. These parasitic side-lobe modes, in the y-direction, would not be blocked by knife-edges 32A and 32B. While the analysis indicted that the waveguide-direction side-lobe modes were very weak compared with the central mode, interference between these side-lobe modes and the central mode, over a long distance, would give rise to the beam-quality distortion that had been observed after the beam had been transmitted over distances greater than about 3 meters.

In order to prevent this interference, an adjustable-aperture assembly 40 is provided between in the beam path following the knife-edges and preceding a collimating lens 34, which provides a collimated output-beam. Assembly 40 includes an aperture-plate 42 having a circular aperture 44 therein. The aperture plate is attached to a mounting-plate 46 which is attached to wall 22 separating resonator-enclosure 16 from beam-train enclosure 25.

In the view of FIG. 1 aperture plate is inclined non-normally to the propagation axis in the waveguide-direction such that aperture 44 appears elliptical. The inclination of plate 42 about an axis 41, parallel to the resonator-direction, is adjustable as indicated by arrows C. The actual dimensions of aperture 44 in the UR and WG directions are bigger than corresponding dimensions of the beam. Inclining plate 42 non-normally, however, reduces the effective (projected) dimension of aperture 44 in the WG-direction.

By adjusting the inclination of plate 42, the effective WG-dimension of aperture 44 can be adjusted to be only just sufficient to pass the beam, thereby preventing any WG-direction side-lobes from being transmitted through the aperture. This adjustment can be made while apparatus 10 is operating, and the far-field quality of the output-beam is being monitored.

FIG. 2A is an isometric view schematically illustrating a preferred arrangement of adjustable aperture assembly 40 of FIG. 1. Here, a screw 50 is provided for attaching assembly 40 to wall 22 of FIG. 1. Aperture plate 42 is attached to base 46 by a screw 52, which, when not fully tightened, provides a pivot for adjusting the inclination of aperture-plate 42 with respect to the WG-direction. An aperture 54 is provided in aperture-plate 42 for accessing screw 52 with a straight Allen-wrench for tightening or loosening the screw. Once an optimum inclination has been determined by observing far-field beam quality as discussed above, screw 52 is fully tightened to fix the inclination of plate 44.

In FIG. 2A plate 42 is depicted as normally inclined to the propagation direction. This is to show that the actual dimensions of aperture 44 are greater than the beam (central mode) dimensions in both the WG- and UR-directions. In practice plate 42 is never in this normal inclination.

Figure 2B:
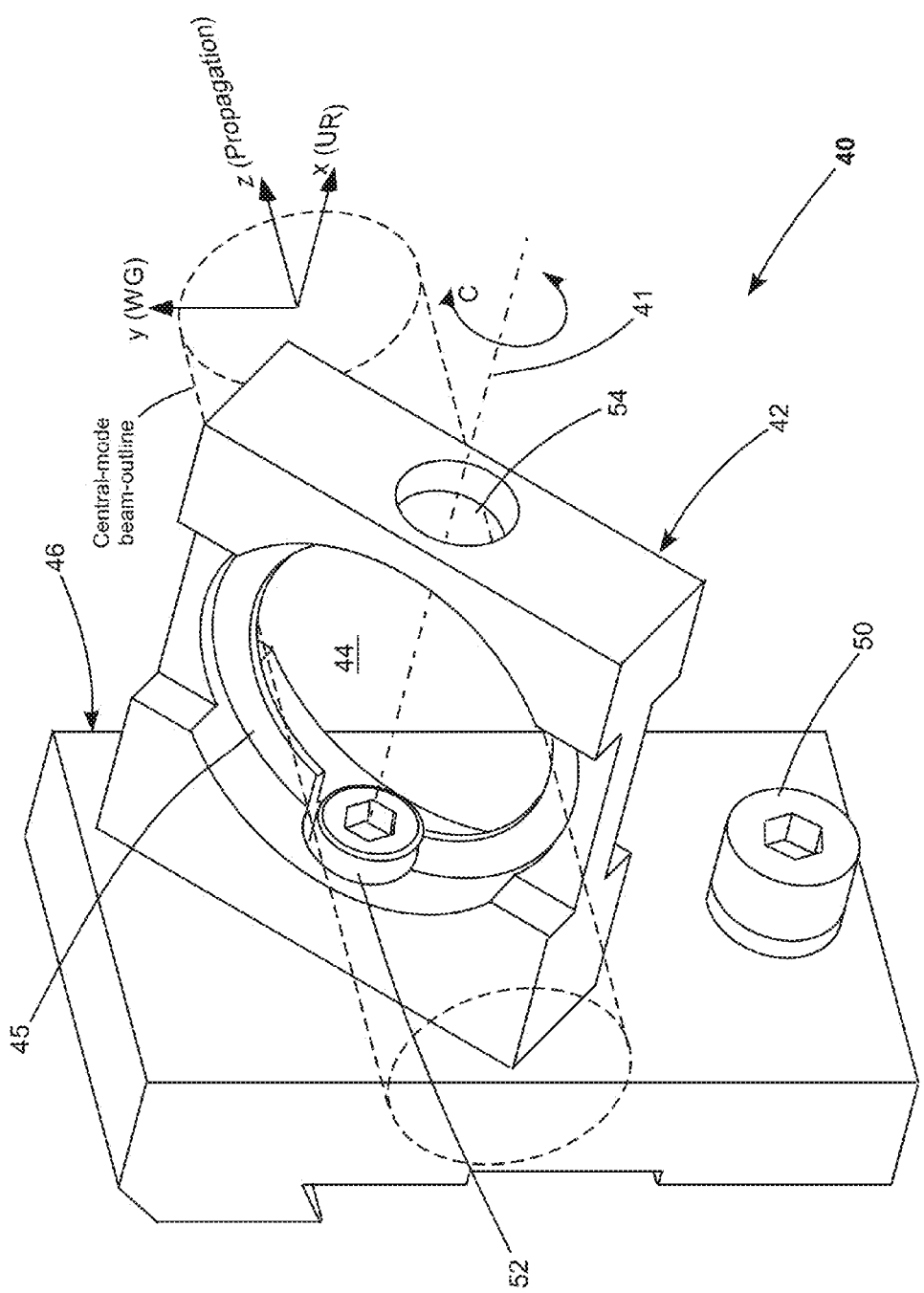
FIG. 2B is an isometric view schematically illustrating the rotationally adjustable aperture of FIG. 2A, but with the aperture non-normally inclined to the transmitted central mode in one axis.

FIG. 2B depicts aperture-plate 42 non-normally inclined to the propagation-direction and the WG direction. Here the effective dimension of aperture 44 in the WG-direction is just sufficient to allow passage of the central-mode, thereby blocking any WG-direction side-lobes that may be present. In practice, plate 42 is always non-normally inclined to the propagation-direction to some degree. The non-normal inclination provides that any blocked radiation is not directed back to the laser resonator.

It should be noted here that while aperture 44 in aperture plate 42 is described as being circular this should not be considered limiting. Other aperture shapes may be used without departing from the spirit and scope of the present invention. Preferably, however, when the plate is normally inclined to the beam, the WG-direction and UR-direction dimensions of the aperture are both greater than corresponding dimensions of the beam.

Figure 3A:
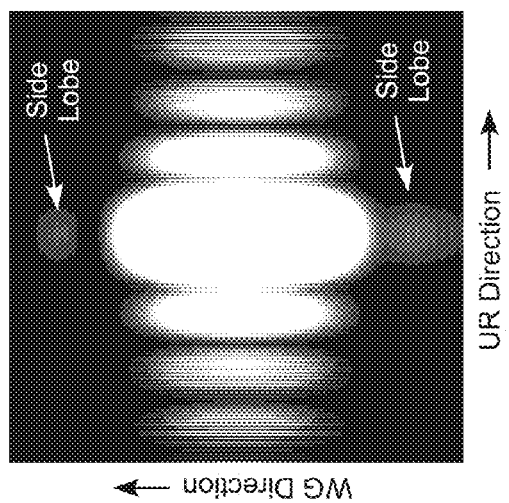
FIG. 3A schematically illustrates calculated beam cross-section intensity-distribution ahead of the parallel knife-edges in an example of the apparatus of FIG. 1 in which the unstable resonator is slightly misaligned.

FIG. 3A schematically illustrates calculated beam cross-section intensity-distribution ahead of the parallel knife-edges in an example of the apparatus of FIG. 1 in which the unstable resonator is intentionally misaligned by misaligning resonator-mirror 14 of FIG. 1 by 0.3 milliradians (mRad). The characteristic pattern of a central-mode with UR-direction side-lobes linearly symmetrically distributed about the central mode can be clearly observed. Faintly observable are two WG-direction (parasitic) side-lobes (indicated) one on either side of the central mode. Such side-lobes, in practice, can also appear as a result of misalignment or distortion of the electrodes.

Figure 3B:
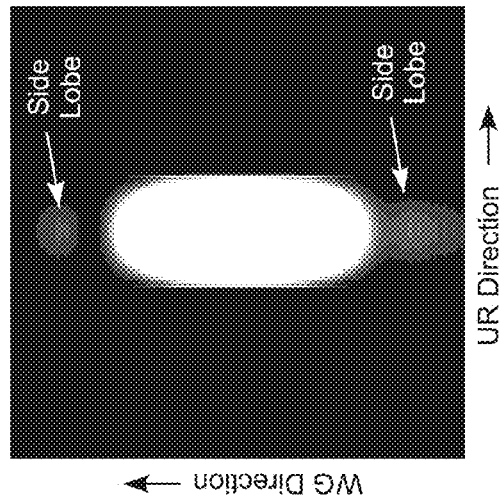
FIG. 3B schematically illustrates the calculated beam cross-section intensity-distribution of a central mode transmitted through the knife-edges and including parasitic vertical side-lobes.

FIG. 3B schematically illustrates the calculated beam cross-section intensity-distribution of the central mode transmitted through the knife-edges. The WG-direction side-lobes (indicated) are transmitted together with the central mode. It is estimated that power in the side-lobes is less than one-thousandth of the power in the central mode. It should be noted here that in FIGS. 3A and 3B the WG-direction dimension is elongated by a ratio of 14:2 compared with the UR-direction dimension. This is to make the faint WG-direction side-lobes more observable than would be the case without the elongation.

Figure 3C:
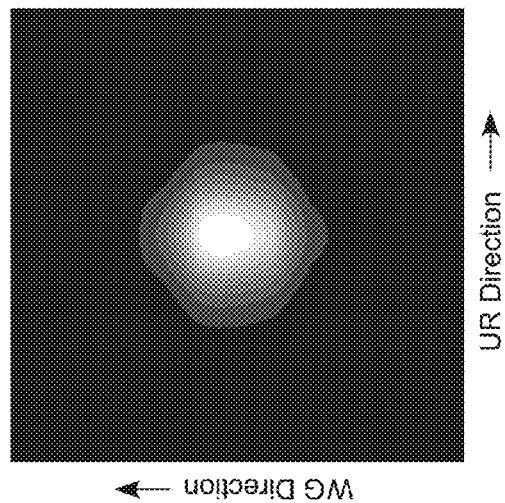
FIG. 3C schematically illustrates calculated beam cross-section intensity distribution of the beam of FIG. 3B collimated by the collimating lens of FIG. 1 and at a distance of 5 meters from the collimating lens.

FIG. 3C schematically illustrates calculated beam cross-section intensity-distribution of the beam of FIG. 3B collimated by the collimating lens of FIG. 1 and at a distance of 5 meters from the collimating lens. Here, the ratio of WG-direction to UR-direction dimensions is 1:1. It can be seen that, despite the relative weakness of the WG-direction side-lobes, there is rotational asymmetry in the intensity-distribution.

Figure 3D:
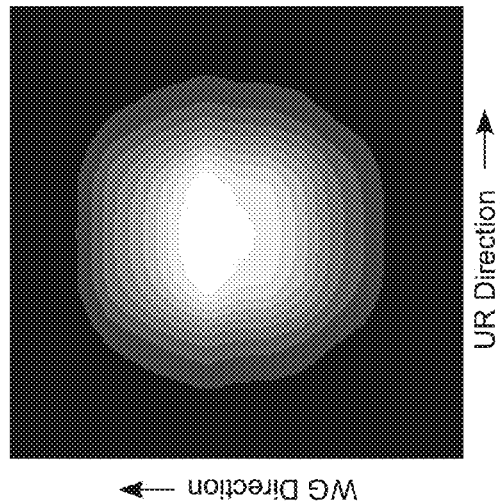
FIG. 3D schematically illustrates calculated beam cross-section intensity-distribution of the beam of FIG. 3B collimated by the collimating lens of FIG. 1 and at a distance of 10 meters from the collimating lens.

FIG. 3D schematically illustrates calculated beam cross-section intensity-distribution of the beam of FIG. 3B collimated by the collimating lens of FIG. 1 and at a distance of 10 meters from the collimating lens. Here again, the ratio of WG-direction to UR-direction dimensions is 1:1. It can be seen that, rotational asymmetry in the intensity-distribution is greater than that at 5 meters from the collimating lens.

Figure 4A:
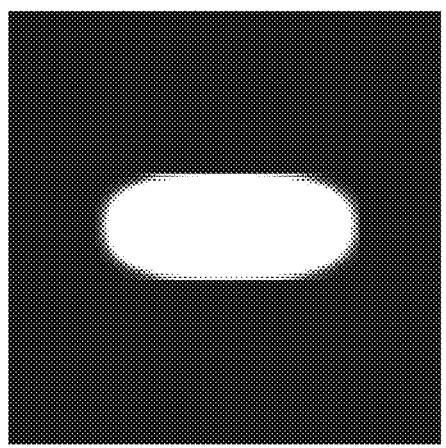
FIG. 4A schematically illustrates the calculated beam cross-section intensity-distribution of a central mode transmitted through the knife-edges of FIG. 1 with the parasitic, vertical side-lobes of FIG. 3B blocked by the rotationally adjustable aperture.

FIG. 4A schematically illustrates the calculated beam cross-section intensity-distribution of a central mode-transmitted through the knife-edges of FIG. 1 with the parasitic vertical side-lobes of FIG. 3B blocked by the inventive rotationally adjustable aperture.

Figure 4C:
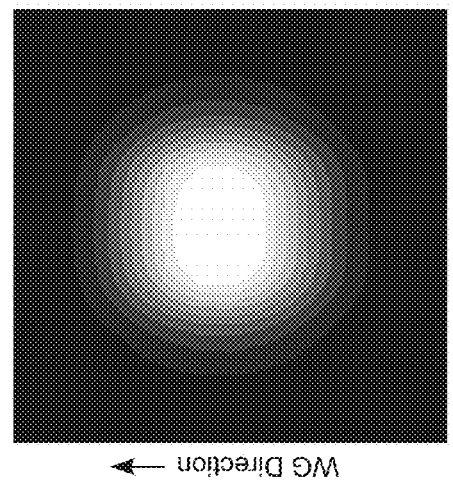
FIG. 4C schematically illustrates calculated beam cross-section intensity-distribution of the beam of FIG. 4A collimated by the collimating lens of FIG. 1 and at a distance of 10 meters from the collimating lens.
Figure 4B:
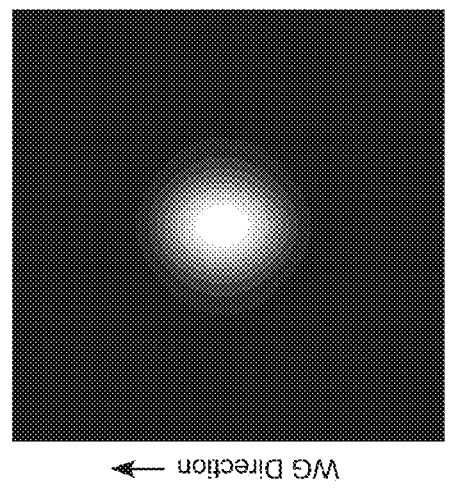
FIG. 4B schematically illustrates calculated beam cross-section intensity-distribution of the beam of FIG. 4A collimated by the collimating lens of FIG. 1 and at a distance of 5 meters from the collimating lens.

FIG. 4B schematically illustrates calculated beam cross-section intensity-distribution of the beam of FIG. 4A collimated by the collimating lens of FIG. 1 and at a distance of 5 meters from the collimating lens. It can be seen that rotational asymmetry of the intensity distribution has been reduced compared with that depicted in FIG. 3C.

FIG. 4C schematically illustrates calculated beam cross-section intensity-distribution of the beam of FIG. 4A collimated by the collimating lens of FIG. 1, and at a distance of 10 meters from the collimating lens. It can be seen that rotational asymmetry of the intensity distribution has been reduced compared with that depicted in FIG. 3C.

It should be noted here that while the rotationally adjustable aperture is depicted in FIG. 1 as being located in the beam-train compartment close to the collimating lens, the aperture could be equally effective at other locations in the beam train between the collimating lens and the knife-edges, at locations between the focusing mirrors and the knife-edges and even between the collimating lens and output-window 35.

It should kept in mind, however, that beam dimensions become smaller the closer the beam is to the knife-edges, which are located at about a focus of the beam provided by focusing mirror 30. Past the knife edges, the beam expands to fill the collimating lens. Because of this, an aperture 44 close to the knife-edges would need to be significantly smaller than an aperture close to the collimating lens. A smaller aperture may have less precise adjustment than the larger aperture.

In summary, the present invention is described above with reference to a preferred embodiment. The invention is not limited, however, to the embodiment described and depicted herein. Rather, the invention is limited only to the claims appended hereto.

What is claimed is:

1. Gas-discharge slab-laser apparatus, comprising:
   an unstable laser-resonator constrained by a waveguide formed between spaced-apart, parallel, planar discharge electrodes, the waveguide constraint being in a first transverse axis perpendicular to the plane of the electrodes, the laser-resonator and electrodes being configured and aligned such that an output-beam from the laser resonator, in the far-field, includes a main lobe with side-lobes on opposite sides of the main lobe, with the main lobe and side-lobes aligned with each other in a second transverse axis parallel to the electrode-plane and wherein the output-beam from the laser-resonator includes parasitic lobes on either side of the main lobe in the first-transverse-axis direction;
   a first adjustable aperture positioned to transmit the main-lobe of the resonator output-beam and block the side-lobes of the resonator output-beam; and
   a second adjustable aperture positioned to transmit the main lobe of the resonator output beam and block the parasitic lobes of the resonator output-beam.

2. The apparatus of claim 1, wherein the second adjustable aperture has physical dimensions greater than corresponding dimensions of the beam in the first and second transverse directions, and is inclined about an axis parallel to the second transverse axis to block the parasitic lobes of the resonator output beam.

3. The apparatus of claim 2, wherein the inclination of the second adjustable aperture is selectable.

4. The apparatus of claim 2, wherein the second adjustable aperture is non-normally inclined to the output beam in the first-transverse-axis direction when the parasitic side-lobes are blocked.

5. The apparatus of claim 2, wherein the second adjustable aperture is a circular aperture.

6. The apparatus of claim 2, wherein the first adjustable aperture includes first and second knife-edges spaced apart and parallel to each other in the first-transverse-axis direction.

7. Gas-discharge slab-laser apparatus, comprising:
   an unstable laser-resonator constrained by a waveguide formed between spaced-apart, parallel, planar discharge electrodes, the waveguide constraint being in a first transverse axis perpendicular to the plane of the electrodes, the laser-resonator and electrodes being configured and aligned such that an output-beam from the laser resonator, in the far-field, includes a main lobe with side-lobes on opposite sides of the main lobe, with the main lobe and side-lobes aligned with each other in a second transverse axis parallel to the electrode-plane and wherein the output-beam from the laser-resonator includes parasitic lobes on either side of the main lobe in the first-transverse-axis direction;
   a pair knife edges positioned to transmit the main-lobe of the resonator output-beam and block the side-lobes of the resonator output-beam; and
   a plate having a circular aperture therein, said aperture being tilted with respect to the first transverse axis direction and positioned to transmit the main lobe of the resonator output beam and block the parasitic lobes of the resonator output-beam.

\* \* \* \* \*